UNITED STATES PATENT OFFICE.

HAROLD P. HAYDEN, OF PERTH AMBOY, NEW JERSEY, ASSIGNOR TO THE BARBER ASPHALT PAVING COMPANY, OF PHILADELPHIA, PENNSYLVANIA, A CORPORATION OF WEST VIRGINIA.

AMELIORATION OF SOIL.

1,228,361.           Specification of Letters Patent.       Patented May 29, 1917.

No Drawing.      Application filed November 16, 1915.     Serial No. 61,752.

*To all whom it may concern:*

Be it known that I, HAROLD P. HAYDEN, of Perth Amboy, in the county of Middlesex and State of New Jersey, have invented certain new and useful Improvements in the Amelioration of Soil, whereof the following is a specification.

My improvements have to do with the amelioration of soil, that is rendering it more suitable for vegetable growth. I have discovered that when a comparatively small quantity of an emulsion of colloidal clay with oil and water, is mixed in with the soil, it is thereby rendered capable of sustaining a more vigorous plant growth than is the case with similar soil with which such an emulsion has not been mixed.

For the practice of my invention I take the required quantity of colloidal clay, which may be procured from various sources. The more highly colloidal its nature the better for the purposes which I am to describe. I mix this colloidal clay with oil, such as crude petroleum or its products, in about equal parts. The mixture may be facilitated by grinding them together in a mortar or in any convenient manner.

To the mixture water is added gradually, the mixture being stirred so as to form an emulsion. The amount of water may be many times that of the oil or the clay. I have found a convenient proportionment of the materials to consist in using ten per cent. of crude petroleum, say Trinidad liquid A, ten per cent. of colloidal clay, and eighty per cent. of water.

Of this oil emulsion a comparatively small quantity is mixed into the soil, say about one tablespoonful to a flower pot full of soil. This may be effected by spading in or in any other convenient manner.

As a result of this mixture of the oil emulsion containing the colloidal clay with the soil, I find that the capacity of the soil to maintain vegetable growth is markedly increased.

Having thus described my invention, I claim:

The process of rendering soil more suitable for vegetable growth, which consists in combining colloidal matter such as clay with oil and water in the form of an emulsion, and effecting the infiltration of the soil with this emulsion.

In testimony whereof, I have hereunto signed my name at Perth Amboy, N. J., this 13th day of November, 1915.

HAROLD P. HAYDEN.

Witnesses:
     WILLIAM F. KERWIN,
     JOS. A. LA FLAMME.